US008309709B2

(12) United States Patent
Berg et al.

(10) Patent No.: US 8,309,709 B2
(45) Date of Patent: Nov. 13, 2012

(54) METHOD OF PREPARING A SEPARATION MATRIX

(75) Inventors: Hans Berg, Uppsala (SE); Maria Brannholm, Uppsala (SE); David Buckley, Uppsala (SE); Philippe Busson, Uppsala (SE); Anders Hagvall, Uppsala (SE); Eva Holmgren, Uppsala (SE); Henrik Ihre, Uppsala (SE); Anders Larsson, Uppsala (SE); Dag Lindstrom, Vattholma (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 815 days.

(21) Appl. No.: 11/913,236

(22) PCT Filed: Jun. 28, 2006

(86) PCT No.: PCT/SE2006/000790
§ 371 (c)(1),
(2), (4) Date: Oct. 31, 2007

(87) PCT Pub. No.: WO2007/004947
PCT Pub. Date: Jan. 11, 2007

(65) Prior Publication Data
US 2008/0154031 A1 Jun. 26, 2008

(30) Foreign Application Priority Data

Jul. 6, 2005 (SE) .................................. 0501609
Oct. 24, 2005 (SE) .................................. 0502373

(51) Int. Cl.
*C07H 1/00* (2006.01)
*A61K 31/715* (2006.01)
*A01N 43/04* (2006.01)
(52) U.S. Cl. ........ 536/124; 536/123.1; 514/54; 514/965
(58) Field of Classification Search ................ 536/124, 536/123.1; 514/54, 965
See application file for complete search history.

(56) References Cited

U.S. PATENT DOCUMENTS

| 4,973,683 A | 11/1990 | Lindgren |
| 5,108,596 A | 4/1992 | Ookuma et al. |
| 5,135,650 A | 8/1992 | Hjerten et al. |
| 5,998,606 A | 12/1999 | Grandics |
| 6,248,268 B1 | 6/2001 | Cook |
| 6,537,793 B2 | 3/2003 | Blanche et al. |
| 6,602,990 B1 | 8/2003 | Berg |
| 7,479,223 B2 * | 1/2009 | DiLeo et al. ............... 210/198.2 |
| 2005/0220982 A1 | 10/2005 | Moya et al. |

FOREIGN PATENT DOCUMENTS

| WO | WO 97/17132 | 5/1997 |
| WO | WO 97/38018 | 10/1997 |
| WO | WO 00/71245 | 11/2000 |
| WO | WO 02/053254 | 7/2002 |
| WO | WO 2006/033634 | 3/2006 |

OTHER PUBLICATIONS

Qi, W., et al., "Preparation of Two Types of Immobilized Metal-Chelated Complex Affinity Membrane Chromatography Media", Journal of Functional Polymers, vol. 13, No. 1, Mar. 2000.
Hjerten, S., "The Preparation of Agarose Spheres for Chromatography of Molecules and Particles", Biochimica et Biophysica Acta, 79 (1964) p. 393-398.
Hermanson, G., et al., Immobilized Affinity Ligand Techniques, Academic Press, Inc., 1992, p. 118.
Patent Abstracts of Japan; 04-330936 Published Nov. 18, 1992.
Patent Abstracts of Japan; 05-057015 Published Mar. 9, 1993.

* cited by examiner

*Primary Examiner* — Shaojia Anna Jiang
*Assistant Examiner* — Everett White

(57) ABSTRACT

The present invention relates to a method of preparing an insoluble separation matrix, which method comprises salt-treatment of a polysaccharide gel followed by cross-linking of the polysaccharide polymers. In one embodiment, the method comprises providing an aqueous solution of a gelatable native polysaccharide; lowering the temperature of the polysaccharide solution to a value below its gelling point; salt-treatment by adding at least one salt to the resulting polysaccharide; and cross-linking the salt-treated polysaccharide. The polysaccharide may be prepared e.g. into particles, membranes or monoliths.

16 Claims, No Drawings

METHOD OF PREPARING A SEPARATION MATRIX

CROSS-REFERENCE TO RELATED APPLICATIONS

This application is a filing under 35 U.S.C. §371 and claims priority to international patent application number PCT/SE2006/000790 filed Jun. 28, 2006, published on Jan. 11, 2007, as WO 2007/004947, which claims priority to Swedish patent application numbers 0501609-2 filed Jul. 6, 2005 and 0502373-4 filed Oct. 24, 2005; the disclosures of which are incorporated herein by reference in their entireties.

TECHNICAL FIELD

The present invention relates to the separation and purification of target molecules, such as biomolecules, and more specifically to a chromatography matrix and a novel method for preparing the same. The invention also encompasses the use of such a matrix in liquid chromatography, and a chromatography column comprising the matrix.

BACKGROUND OF THE INVENTION

The recent advances in the field of biotechnology have required faster and more accurate techniques for recovery, purification and analysis of biological and biochemical substances, such as proteins. Chromatography is a commonly used purification technique in this field. In chromatography, two mutually immiscible phases are brought into contact. More specifically, the target molecule is introduced into a mobile phase, which is contacted with a stationary phase. The target molecule will then undergo a series of interactions between the stationary and mobile phases as it is being carried through the system by the mobile phase. The interactions exploit differences in the physical or chemical properties of the components in the sample. In liquid chromatography, a liquid sample, optionally combined with a suitable buffer constitutes the mobile phase, which is contacted with a stationary phase, known as a separation matrix. Usually, the matrix comprises a support to which ligands, which are groups capable of interaction with the target, have been coupled.

Separation matrices are commonly based on supports made from inorganic materials, such as silica, or organic materials, such as synthetic or natural polymers. The synthetic polymers, such as styrene and divinylbenzene, are often used for supports that exhibit some hydrophobicity, such as size exclusion chromatography, hydrophobic interaction chromatography (HIC) and reverse phase chromatography (RPC). Further, the synthetic polymers are sometimes preferred over natural polymers, as they are easily made more rigid and pressure-resistant, resulting in supports that provide more advantageous flow properties.

The natural polymers, which are commonly polysaccharides such as agarose, have been utilised as supports of separation matrices for decades. Due to the presence of hydroxyl groups, the surfaces of the natural polymers are usually hydrophilic, giving essentially no non-specific interactions with proteins. Another advantage of the natural polymers, which is of specific importance in the purification of drugs or diagnostic molecules for internal human use, is their non-toxic properties. Agarose can be dissolved in water at increased temperature, and will then form a porous gel upon cooling to a certain temperature (the gelling point). On heating, the gel will melt again at a temperature (the melting point), which is usually considerably higher than the gelation point. The gelation involves helix-helix aggregation of the polysaccharide polymers, and is sometimes referred to as a physical cross-linking.

As mentioned above, the natural polymers are less rigid and pressure-resistant than synthetic polymers, and consequently methods have been developed for improvement thereof. For example, by varying the concentration of polysaccharide, the porosity of the support may be increased, resulting in improved target mass transport and increase of the area with which the target interacts during chromatography. Another essential parameter to consider is the flow properties of the support, for example in a packed bed of particulate separation matrix. When the mobile phase is forced through the bed, the back pressure will mainly be controlled by the interstitial channels between the particles. At low flow rates, the particles can be regarded as incompressible and then the back pressure increases linearly with the flow rate, with the slope depending on the particle size. As the flow rate increases, the particles may start to deform under the hydrostatic pressure, resulting in diminishing diameters of the interstitial channels and a rapidly increasing back pressure. At a certain flow rate, depending on the rigidity of the matrix, the bed will collapse and the back pressure approaches infinity.

The most commonly way to improve the rigidity and hence the flow properties of agarose is chemical cross-linking thereof. Such cross-linking takes place between available hydroxyl groups, and may be obtained by commonly known methods using e.g. epichlorohydrin.

U.S. Pat. No. 4,973,683 (Lindgren) relates to the cross-linking of porous polysaccharide gels, and more specifically to a method of improving the rigidity while minimising the non-specific interaction of a porous polysaccharide gel. The method involves providing an agarose gel and a reagent denoted "monofunctional", which comprises a reactive group, such as a halogen group or an epoxide group, and a double bond. The reagent is bound to the gel via its reactive group; and the double bond is then activated into an epoxide or halohydrin, which is finally reacted with hydroxyl groups on the agarose to provide cross-linking.

U.S. Pat. No. 5,135,650 (Hjerten et al) relates to highly compressible chromatographic stationary phase particles, such as agarose beads, which are stated to be sufficiently rigid for HPLC and non-porous to the extent that they are impenetrable by solutes. More specifically, the Hjerten beads are produced from porous agarose beads, which are contacted with an organic solvent to collapse the porosity, after which the bead surfaces inside the collapsed pores are cross-linked to fix the pores in their collapsed state. Alternatively, the beads are produced by filling the pores with a polymerisable substance, which grafts to the pore surfaces, and performing graft polymerisation. One stated advantage of the invention disclosed is that a single stationary phase is effective at high pressures and yet can be used at low pressures. However, the use of solvents, especially such solvents as used in this patent, is in general avoided for health and safety reasons.

U.S. Pat. No. 6,602,990 (Berg) relates to a process for the production of a porous cross-linked polysaccharide gel, wherein a bifunctional cross-linking agent is added to a solution of polysaccharide and allowed to bind via its active site to the hydroxyl groups of the polysaccharide. A polysaccharide gel is then formed from the solution, after which the inactive site of the cross-linking agent is activated and cross-linking of the gel performed. Thus, the cross-linking agent is introduced into the polysaccharide solution, contrary to the above discussed methods wherein it is added to a polysaccharide gel. The bifunctional cross-linking agent comprises one active site, i.e. a site capable of reaction with hydroxyl groups of the polysaccharide, such as halides and epoxides, and one inactive site, i.e. a group which does not react under the conditions where the active site reacts, such as allyl groups. Thus, the present bifunctional cross-linking agent corresponds to the "monofunctional reagents" used according to the above-discussed U.S. Pat. No. 4,973,683 (Lindgren). Particles comprised of the resulting gel have been shown to present an improved capability of withstanding high flow rates and back pressures. A drawback with the U.S. Pat. No. 6,602,990 method is that bromine is required for the activation of the cross-linking agent.

U.S. Pat. No. 5,998,606 (Grandics) relates to a method of synthesising chromatography matrices, wherein cross-linking and functionalisation of a matrix takes place simultaneously. More specifically, double bonds provided at the surface of a polymeric carbohydrate matrix are activated in the presence of a metallic catalyst to cross-link the matrix and functionalise it with halohydrin, carboxyl or sulphonate groups. The double bonds are provided at the matrix surface by contact with an activating reagent, which contains a halogen atom or epoxide and a double bond. Thus, the U.S. Pat. No. 5,998,606 activating reagent corresponds to the U.S. Pat. No. 4,973,683 monofunctional reagent and the U.S. Pat. No. 6,602,990 bifunctional cross-linking agent.

Qi et al (Journal of Functional Polymers, Vol. 13, March 2000: "Preparation of Two Types of Immobilized Metal-Chelated Complex Affinity Membrane Chromatography Media") describes how macro-porous cellulose affinity membranes are produced using cellulose filter paper as the matrix, going through alkali treatment, epoxidation activation, coupling with disodium iminodiacetate, and immobilizing $Cu^{2+}$. In addition, agarose was covalently cross-linked onto the post-activation membranes to produce membranes that possess a sandwich-like structure.

US 2005/0220982 (Moya et al) relates to a method of forming polysaccharide structures such as beads, gel films and porous coatings on porous substrates by forming a room-temperature gel-inhibited solution of a polysaccharide, one or more gel-inhibiting agent(s) and a solvent such as water, heating the mixture until all the components are dissolved, cooling the mixture as a solution to about room temperature, forming a three dimensional structure with the solution and adding the structure to a gelling agent to form a polysaccharide gel. The gel-inhibiting agent is e.g. based on zinc, lithium or sodium salts. The coating of polysaccharide is stated to be thick enough to allow for diffusive flow to occur within the polysaccharide layer itself. A stated advantage of the described method is that the structures are formed at room temperature and with controlled gelling of the polymer with polysaccharide polymers that normally gel well above room temperature. It is also stated that the coating of surfaces is achieved without substantially blocking the pores with the polysaccharide. However, such operating at room temperature will require careful control of the agarose solution, which makes the overall process relatively time-consuming.

Thus, even though techniques are available for producing cross-linked polysaccharide separation matrices, different future applications will put different requirements on the matrix, resulting in an ongoing need of alternative methods.

BRIEF DESCRIPTION OF THE INVENTION

One aspect of the present invention is to provide a method for preparing a polysaccharide separation matrix, which matrix presents flow properties suitable for large scale processing. This can be achieved by preparing a separation matrix as defined in the appended claims.

A specific aspect of the present invention is to provide a method for preparing a particulate polysaccharide separation matrix, which allows cross-linking with reduced risk of aggregation. This can be achieved by a separation matrix prepared as defined in the appended claims, which can be cross-linked at higher temperatures than conventionally used.

A specific aspect of the present invention is to provide a method that enables manufacture of a porous separation matrix of improved rigidity without collapsing the pore structure. This can be achieved using the method defined in the appended claims to prepare a separation matrix, the pore size of which allows the target molecules to enter the pores. This aspect is advantageous for the purification and/or isolation of relatively small target molecules, such as proteins, at increased flow rates.

Other aspects and advantages of the present invention will appear from the detailed description that follows.

DEFINITIONS

The term "particulate" separation matrix means herein a separation matrix comprised of particles, such as essentially spherical particles or less regularly shaped particles.

The "gelling point", sometimes herein denoted the "gelling temperature" means the temperature at which the polymers of a solution interacts physically to form a solid gel.

The term "gelatable" means herein capable of forming a physical gel.

The term "native" polysaccharide refers to a polysaccharide in a non-modified state, i.e. a polysaccharide which has not been substituted or derivatised.

The term separation "matrix" means herein a material comprised of a porous or non-porous solid support, to which ligands have been attached. In the field of chromatography, the separation matrix is sometimes denoted resin or media.

The term "ligands" is used herein in its conventional meaning, i.e. for chemical entities which are capable of interacting with a target molecule, such as charged groups capable of interacting with an oppositely charged target molecule in an ion-exchange process.

$K_{av}$ is a gel filtration (size exclusion chromatography) parameter defined as $(V_e-V_0)/(V_t-V_0)$, where $V_e$ is the elution volume of the test molecule peak, $V_o$ is the void volume of the column and $V_t$ is the total bed volume. $K_{av}$ is a measure of the fraction of the stationary phase volume accessible to the particular test molecule.

$K_{av\,DX}$ is $K_{AV}$ for dextran molecules. In the examples, dextran of molecular weight 110 kD, 500 kD and 1000 kD, respectively, have been used.

DETAILED DESCRIPTION OF THE INVENTION

The present invention relates to a method of preparing an insoluble separation matrix, such as particles, a monolith or a membrane, by salt-treatment of a polysaccharide gel followed by cross-linking of the polysaccharide polymers. The method may include a preceding step of providing the polysaccharide gel from a solution thereof, preferably by lowering its temperature. The gel may be provided as a coating of a membrane carrier; as polysaccharide particles; or as a coating on particles made from a different material. The gel is advantageously porous.

Thus, in a first aspect, the present invention relates to a method of preparing a separation matrix, which method comprises the steps of (a) providing an aqueous suspension of particles comprised of gelled native polysaccharide;
(b) salt-treatment of the suspended particles by adding at least one salt; and
(c) cross-linking of the salt-treated particles.

The polysaccharide may be any polysaccharide capable of forming a gel, preferably by a change of temperature, and may be selected from the group consisting of agarose, agar, cellulose, dextran, starch, chitosan, konjac, curdlan, carrageenan, pectin, gellan, and alginate. As the skilled person will understand, such gelled polysaccharide particles are advantageously comprised of one polysaccharide, but the present invention also embraces using particles comprised of a mixture of two or more polysaccharides. In an advantageous embodiment of the present method, the polysaccharide is agarose. In a specific method, a particle core or carrier is coated with a polysaccharide as described above. The carrier may be as discussed below in the context of the membrane carrier.

As appears from the above, according to the present invention, the polysaccharide particles provided in step (a) are comprised of native polysaccharide, i.e. a polysaccharide the polymers of which have not been subject to any modification or substitution such as derivatization or cross-linking. Thus, the present invention adds salt to non-modified polysaccharide.

In an advantageous embodiment, the polysaccharide particles are essentially spherical particles (beads). In the field of chromatography, particle size is commonly given as the median particle size of the cumulative volume distribution. In the present method, the average size of the beads may be in a range of 10-300 µm, preferably 30-200 µm or more preferably 45-165 µm, such as about 45 µm, in diameter.

Such polysaccharide beads are easily prepared by the skilled person in this field according to standard methods, such as inverse suspension gelation (S Hjerten: Biochim Biophys Acta 79(2), 393-398 (1964). For example, when preparing agarose, agarose droplets are obtained by dissolving or dispersing the agarose in an aqueous solvent, such as water, or any other commonly used solvent, at a temperature above its melting point. The dissolved agarose is then emulsified in a commonly used organic solvent such as toluene or heptane with stirring, after which the temperature is reduced to below the agarose gelling point, conveniently to room temperature. In the present method, the beads so produced are advantageously washed to remove any trace of solvent, e.g. with ethanol or water, and suspended in water or a suitable aqueous solution. Thus, in an advantageous embodiment, the particles are washed before the cross-linking step.

As understood by the skilled person in this field, there are other methods of preparing the aqueous suspension of polysaccharide particles than emulsion. Thus, in an alternative embodiment, polysaccharide particles are obtained by spraying a composition, which is comprised of a thermally gelatable polysaccharide in an aqueous medium, into ambient air and allowing the atomised composition to gel in the air, as disclosed e.g. in U.S. Pat. No. 6,248,268 (FMC Corporation), which is hereby incorporated herein via reference.

In an alternative embodiment, the polysaccharide particles are irregularly shaped, such as obtainable for example simply by preparing a large segment of polysaccharide and crushing it into suitable average particle size. In yet an alternative embodiment, the polysaccharide particles are elongated such as oval or fibre-like particles.

The salt added in step (b) in the present method may be any salt capable of providing the desired rigidity at selected temperature and salt concentration, but is preferably composed of two ions which both are rated at the higher end of the Hofmeister series.

In one embodiment, the anion of the salt added in step (b) is a sulphate or phosphate, preferably sulphate. In another embodiment, the cation of the salt is selected from the group consisting of Mg; Li; Na; K; and $NH_4$. In an advantageous embodiment, the cation of the salt is selected from the group consisting of Mg and Na. Thus, the salt added in step (b) may e.g. be $MgSO_4$ or $Na_2SO_4$. In an advantageous embodiment, the salt is $MgSO_4$.

The salt(s) added in step (b) may be added in aqueous solution or solid form. In one embodiment, the amount of salt(s) added in step (b) is sufficient to provide a final concentration in the suspension which is in the range of 0.5-1.3 M. In a specific embodiment, the salt concentration in the suspension is below 1.0 M, such as in the range of 0.5-1.0M, and preferably 0.5-0.8 or 0.8-1.0M. In an alternative embodiment, the salt concentration in the suspension is above 1.0 M, such as in the range of 1.0-1.3M, and preferably 1.0-1.2, e.g. about 1.1M or 1.2-1.3M.

The suspension to which the salt has been added is maintained at an increased temperature for a sufficient time for the polysaccharide properties to change towards the improved flow properties and improved rigidity observed by the present inventors, preferably with stirring. The duration of the salt treatment is easily determined by the skilled person in this field, and may e.g. last for up to one hour, such as 20-40 minutes, and advantageously for about 30 minutes. Thus, the temperature during the salt treatment may be maintained anywhere in the range of 94-98° C., and is adapted depending on the desired properties of the matrix. In one embodiment, the temperature is in the range of 94-96° C., such as 94-95° C. or 95-96° C., such as about 94, about 95 or about 96° C. In another embodiment, the temperature is in the range of 96-98° C., such as 96-97° C. or 97-98° C., such as about 97 or about 98° C.

In an advantageous embodiment, the present method comprises salt-treatment, preferably by addition of sulphate, such as $Na_2SO_4$ or $MgSO_4$, at a temperature of about 96° C. In a more advantageous embodiment, the method comprises salt-treatment by adding $Na_2SO_4$ or $MgSO_4$ up to a salt concentration in the suspension of above 1.0 M, the treatment taking place at a temperature of about 96-97° C.

As appears from the above, the polysaccharide particles are cross-linked in a step subsequent to the salt addition. In an advantageous embodiment, in step (c), the cross-linking step comprises the addition of a cross-linking agent. The cross-linking agent may be any suitable monomer or bifunctional reagent known to polymerise polysaccharides, such as epichlorohydrin, divinylsulfone, diepoxides, diisocyanates etc. Cross-linking of polysaccharides is well known in this field, see e.g. the above-discussed U.S. Pat. No. 4,973,683 and U.S. Pat. No. 6,602,990. One advantage of the present method is that it allows the manufacture of highly rigid polysaccharide particles by cross-linking at a higher temperature than the commonly used techniques, which in turn reduces or even eliminates aggregate formation. Without wishing to be bound by any specific theory, it can be assumed that this feature is connected to the salt addition before cross-linking.

In one embodiment, the present method comprises a subsequent step of attaching chromatography ligands to hydroxyl groups of the cross-linked polysaccharide matrix. Attaching chromatography ligands, also known as functionalisation or sometimes derivatisation, to an insoluble matrix may be provided by attaching charged or chargeable groups to prepare an ion-exchange matrix; by attaching groups that exhibits biological affinity to prepare an affinity matrix; by attaching chelating groups to make an immobilised metal affinity chromatography (IMAC) matrix; or by attaching hydrophobic groups to make a hydrophobic interaction chromatography (HIC) matrix. Alternatively, groups known as multimodal i.e. groups that contain more one than one group, such as ion-exchange groups in addition to hydrophobic groups, are attached to the matrix prepared according to the invention. In a specific embodiment, the functional groups are ion-exchange ligands selected from the group consisting of quaternary ammonium (Q), diethylaminoethyl (DEAE), diethylaminopropyl, sulphopropyl (SP), and carboxymethyl (CM) groups. Methods for attachment of functional groups to an insoluble support such as a separation matrix are well known to the skilled person in this field and may involve a preceding step of allylation of the substituent and use of standard reagents and conditions. (See e.g. Immobilized Affinity Ligand Techniques, Hermanson et al, Greg T. Hermanson, A. Krishna Mallia and Paul K. Smith, Academic Press, INC, 1992). In a specific embodiment, the cross-linked separation matrix is provided with extenders, also known as flexible arms, tentacles, or fluff, before functionalisation. A well-known extender is dextran; see e.g. U.S. Pat. No. 6,537,793 wherein the addition of extenders to a polysaccharide matrix is described in more detail.

The present invention also encompasses the sterilization of a cross-linked separation matrix treated according to the invention. In another embodiment, the method relates to packing or simply providing a vessel with a separation matrix and subsequently sterilizing the vessel with its contents. Thus, a specific embodiment of the method comprises providing the cross-linked separation matrix in a chromatography column prior to the sterilization. The sterilization may be carried out by heat and/or steam treatment, such as autoclavation; radiation; microwaves; high pressure; chemical reagents; or any other well known sterilization method.

Another aspect of the present invention is a cross-linked separation matrix prepared as described above. In an advantageous embodiment, the polysaccharide separation matrix according to the invention is comprised of essentially spherical, porous particles. In one embodiment, the particles exhibit a $K_{av}$ value for a dextran of 110 kDa of at least about 0.4, preferably >0.5. In an advantageous embodiment, the particles have been provided with chromatography ligands. In this embodiment, the pores are of a sufficient size to allow entry of target molecules to be separated, hence improving the binding capacity of the particles. In addition, the method of preparation described above provides a sufficiently rigid matrix for large scale processing. This embodiment is useful for any one of the target molecules exemplified below in the context of the use aspect, but is particularly advantageous for relatively small target molecules such as proteins.

Even though a separation matrix in the form of particles has been discussed above, as understood by the skilled person in this field, the present method is equally useful for making separation matrices of other formats. Thus, the separation matrix according to the present invention may be prepared into any other commonly used shape, such as monoliths; filters or membranes; chips; surfaces; capillaries; fibres etc.

In an advantageous embodiment, the present method of preparing a separation matrix comprises method of preparing a separation matrix, which method comprises the steps of
(i) providing an aqueous solution of a gelatable native polysaccharide;
(ii) lowering the temperature of the polysaccharide solution to a value below its gelling point;
(iii) salt-treatment by adding at least one salt to the polysaccharide resulting from (ii); and
(iv) cross-linking the salt-treated polysaccharide.

In one embodiment, the polysaccharide is a native polysaccharide i.e. a polysaccharide the polymers of which have not been subject to any modification or substitution such as derivatization or cross-linking. In an advantageous embodiment, the salt(s) are added up to a concentration in the solution in the range of 0.5M-1.3M.

Any one of the details above in the context of the first aspect such as the polysaccharide, nature of the salt, temperature and salt concentrations etc. may be applicable to the method above for preparing other formats of the separation matrix.

As appears from the above, the polysaccharide may be prepared into particles. In one embodiment, the separation matrix is a membrane, or a filter. Apart from the details above resulting in the rigid matrix of the invention, the preparation of membranes is well known and easily carried out by the skilled person in this field.

In an alternative embodiment, the separation matrix is a monolith. In this embodiment, a porogen is advantageously added to ensure the desired porosity of the monolithic product. Suitable porogens are well known in this field, and may e.g. be polyethylene glycol. Other details regarding the manufacture of monoliths are well known in this field.

Another aspect of the invention is a chromatography column comprising a separation matrix as described above. The column may be made from any conventional material, such as a biocompatible plastic, e.g. polypropylene, glass or stainless steel. The column may be of a size suitable for laboratory scale or large-scale purification. In a specific embodiment, the column according to the invention is provided with luer adaptors, tubing connectors, and domed nuts.

In an advantageous embodiment, step (i) above comprises to also provide a porous membrane carrier and contacting said carrier with the polysaccharide solution. The contacting may e.g. be by immersion of the membrane carrier in a hot solution of polysaccharide, in which case the polysaccharide-soaked membrane is preferably removed from the solution before the cooling of step (ii). The membrane carrier may be made of any material which is compatible with the polysaccharide solution, and is consequently advantageously essentially hydrophilic. Thus, in one embodiment, the membrane carrier is made of a hydrophilic polymer, such as a polymer selected from the group consisting of agarose, agar, cellulose, dextran, starch, chitosan, konjac, curdlan, carrageenan, pectin, gellan, alginate and any mixture of two or more of said polymers. In an advantageous embodiment of the present method, the membrane carrier is made from cellulose. In the most advantageous embodiment, the cellulose membrane carrier is contacted with an agarose solution to provide a hybrid cellulose-agarose membrane. In an alternative embodiment, the membrane carrier is made of a synthetic polymer, or a ceramic material, which has been treated to exhibit a substantially hydrophilic surface, such as by chemical modification of the surface. Thus, in one embodiment, the membrane carrier exhibits a hydrophilic surface.

The membrane carrier used in the present method may be a commercially available membrane. Alternatively, it is prepared following methods well known in this field. The average pore size of the membrane carrier will depend on its intended use, and may be anywhere in the range of 0.1-10 μm, such as 0.2-5 μm. In a specific embodiment, the membrane is provided as a cartridge. In another embodiment, the membrane is a stacked membrane. In a specific embodiment, the membrane according to the invention is provided on a roll. As understood by the skilled person, the size and geometry of the membrane carrier will also depend on the use.

The salt treatment of step (iii) is advantageously carried out by soaking the membrane carrier in a warm, aqueous salt solution for a suitable period of time to obtain desired flow properties of the final product. In one embodiment, the duration of the salt treatment is 0.5-4-h, such as 1-3 h, e.g. 1 or 2 hours. The skilled person in this field can use simple testing to find the most suitable period of time for a given membrane carrier—polysaccharide combination. As shown in the Experimental part below, the present inventors have unexpectedly shown that by treating a polysaccharide coated membrane carrier with salt according to the invention, the porosity of the membrane carrier, which was substantially reduced after the coating step, could be recreated.

The polysaccharide coating of the salt-treated membrane is then cross-linked according to any well known method in this field. In one embodiment, the method for preparing a membrane comprises a subsequent step of attaching chromatography ligands to hydroxyl groups of the polysaccharide coating. Such functionalization by attaching ligands may be provided as described above. In a specific embodiment, the cross-linking and functionalisation takes place substantially simultaneously.

In another aspect, the present invention relates to a membrane prepared by providing a porous membrane carrier and contacting said carrier with an aqueous solution of a gelatable polysaccharide; wherein a polysaccharide coating which presents improved flow properties is obtained by a method as described in U.S. Pat. No. 6,602,990 (Berg) or SE 0402322-2 (Berg et al.). Both said methods involve a modification of the polysaccharide such as by allylation or other derivatisation of the polysaccharide polymers before gelling thereof, which will enhance the rigidity of the coating obtained after cross-linking The membrane carrier may e.g. be cellulose or any other hydrophilic material; and the coating polysaccharide is advantageously agarose.

In an advantageous embodiment, the present method comprises a step of sterilization of the cross-linked separation matrix so obtained. Sterilization may be carried out as discussed above. In a specific embodiment, the membrane according to the invention is prepared for single use, also known as a disposable product. Single use is advantageous e.g. in cases where the membrane is used to adsorb contaminants, such as contaminants which for safety or health reasons are treated with restrictions. Single use is also advantageous in cases where purity is of utmost importance, such as in the pharmaceutical industry. A further advantage of single use products is that the need for cleaning validation is eliminated.

In an alternative embodiment, the separation matrix is a monolith. In this embodiment, a porogen is advantageously added to ensure the desired porosity of the product. Suitable porogens are well known in this field, and may e.g. be polyethylene glycol. Other details regarding the manufacture of monoliths are well known in this field.

Finally, the present invention relates to the use of a separation matrix prepared as described above for virtually any kind of target molecules. Thus, in one embodiment of the present use, a biomolecule or an organic molecule is isolated, purified and/or removed from a liquid. Thus, this aspect is a method of liquid chromatography, as discussed above, and involves adsorbing a target molecule to the matrix and optionally a subsequent step of selective desorption of the target, commonly known as gradient elution. If required, one or more washing steps are provided between adsorption and elution. Alternatively, the present use is for retardation of a target molecule, in which case the target is selectively retarded on the column, as compared to other components. In this case, there is no need of an elution step.

In one embodiment, the present column comprises essentially spherical, porous particles. The chromatography column may be packed with the separation matrix according to the invention for use in HPLC. Alternatively, the separation matrix according to the invention is merely filled in the column to allow use in fluidised bed mode, also known as expanded bed adsorption (EBA). In yet another alternative, the separation according to the invention is a monolith which is polymerized in the column. In an advantageous embodiment of the invention, the column comprising a separation matrix according to the invention has been sterilized to allow single use. Such a single use or disposable column is especially advantageous in the pharmaceutical industry, and sometimes also in the diagnostic field, when sterility is an issue.

The present invention also encompasses a kit comprising, in separate compartments, a chromatography column comprising a separation matrix as described above; at least one buffer; and written instructions related to the purification of target molecules.

Finally, the present invention relates to the use of a separation matrix prepared as described above for any kind of target molecule. Thus, in one embodiment of the present use, a biomolecule or an organic molecule is isolated, purified and/or removed from a liquid. Thus, this aspect is a method of liquid chromatography, as discussed above, and involves adsorbing a target molecule to the matrix and optionally a subsequent step of selective desorption of the target, commonly known as gradient elution. If required, one or more washing steps are provided between adsorption and elution. Alternatively, the present use is for retardation of a target molecule, in which case the target is selectively retarded on the column, as compared to other components. In this case, there is no need of an elution step.

In one embodiment of the present use, a liquid flow of at least about 300 cm/h, such as at least 400, preferably at least 500 and more preferably at least 700 cm/h, is applied to a matrix comprised of essentially spherical particles that exhibit a $K_{av}$ of at least about 0.4 for dextran of molecular weight 110 kD.

As appears from the above, the target molecules may be any biological molecules, such as peptides, proteins, such as receptors and monoclonal or polyclonal antibodies, nucleic acids, such as DNA, RNA and oligonucleotides, e.g. plasmids, virus, and prokaryotic or eukaryotic cells; or organic molecules, such as drug candidates etc. In one embodiment, the drug candidate can be used in personalised medicine. The separation matrix prepared according to the present invention is also useful to separate target molecules useful in the food and beverage industry, such as purification of functional food stuff and/or the purification of a beverage from contaminating target molecules. Well known target molecules from the food industry are whey products, such as various milk proteins.

A last aspect of the present invention is the use of the separation matrix prepared according to the present invention as a carrier for the growth of adherent cells in culture. Such cells may e.g. be embryonic or adult stem cells. A further use of the matrix is for immobilisation of enzymes to produce a biocatalyst.

EXAMPLES

The present examples are provided for illustrative purposes only, and are not to be construed as limiting the present invention as defined by the appended claims. All references

| Materials and Methods |
| Particle properties |
| Dextrans for Kd evaluation of prototypes |

| | |
|---|---|
| Raw dextran | 5 mg/ml |
| M = 196300 | 10 mg/ml |
| M = 123600 | 10 mg/ml |
| M = 66700 | 10 mg/ml |
| M = 43500 | 10 mg/ml |
| M = 4440 | 10 mg/ml |
| M = 1080 | 10 mg/ml |

All dextrans diluted with 0.2M NaCl solution, with the exception of raw dextran which was diluted in 0.25M NaCl.

Effectivity Test

The effectivity test was performed using an ÄKTA™ explorer (ID 494) (GE Healthcare, Uppsala, Sweden) by injection of 1% acetone solution. This test gives a value of the quality of the column packing Approved asymmetry is in the range of 0.75-1.25 and a plate number >1000 Nm.

Selectivity

The $K_d$ evaluation was carried out using an ÄKTA™ explorer (ID 494) equipped with an A-900 autosampler. A Shimadzu RI-detector (RID-10A) was connected to the ÄKTA™ system for detection of the dextran samples. The following conditions were used:

Flow: 0.2 ml/min
Mobile phase: 0.2M NaCl
Injection loop: 100 µl

Evaluation

The dextran peaks were evaluated according to well known methods in this field. The $K_d$ values were then calculated as a measure of available pore surface as follows:

$K_d = (V_e - V_0)/(V_c - V_d\text{-gel matrix}) = (V_e - V_0)/(V_t - V_0)$ $V_e$ = retention volume eluted dextran (ml)
$V_0$ = void volume (retention raw dextran) (ml)
Vc = calculated column volume (bed height (cm)×surface area column (cm$^2$)) (ml)
Vt = total liquid volume (retention volume NaCl) (ml)

Example 1

General Synthesis of Polysaccharide Particles

Salt treatment: Approximately 1.5 g non-crosslinked Sepharose™ HP (Amersham Biosciences, Uppsala, Sweden) was washed with 10 bed volumes of deionised water to provide an aqueous suspension of gel particles of 75%. Salts as specified below for each prototype were then added to the suspension. The reaction mixture was heated to the temperature specified below for each prototype for 30 minutes with stirring before cooling down to below 30° C. with ice bath. The salts in the suspension were then removed by washing the gel with 10 bed volumes of water on a sinter glass funnel.

Cross-linking: Cross-linking was performed with epichlorohydrin as cross-linking agent and according to Porath (Gel product for separation, 1982, EP 81850244) with 4 times the stated epichlorohydrin and NaOH.

Functionalisation: To provide an anion exchanger, quaternary ammonium groups (Q groups) were attached to the cross-linked particles according to well known methods. Titration of Cl⁻ with 0.1 M AgNO$_3$ was performed after the attachment to measure the amount of functional Q groups.

Column-packing: Particles prepared as described above were packed in HR 5/20 columns (GE Healthcare, Uppsala, Sweden) with deionised water as packing liquid. The columns were first packed at a flow rate of 306 cm/h for approximately 15 minutes and then at a flow rate of 764 cm/h for approximately 15 minutes. The column packing was tested by measuring the peak asymmetry after injecting 25 µl of 0.4% acetone at a flow rate of 76 cm/h. Columns with peak asymmetry between 0.8 and 1.8 were deemed acceptable in this study.

Examples 2-4

Particle Prototypes

Starting from commercially available Sepharose matrices, prototypes were prepared as described above with varying salts, treatment times and durations. The results are reported in the Tables below.

Examples 5-6

Comparative Particle Examples

Two comparative examples were performed, testing the two Sepharose™ matrices used as starting materials in Examples 2-4 above but omitting the salt treatment step.

Results

TABLE 1

Flow rates

| Prototype | Base matrix | Salt treatment M (mol/liter particle suspension) | Max. temp (° C.) | Particle diameter (Malvern, d50$_v$) (µm) | Flow rate (max) (ml/min) |
|---|---|---|---|---|---|
| Ex. 2 U1262069 | Sepharose ™ 4B | 0.35M MgSO$_4$ + 0.5M Na$_2$SO$_4$ | 96.8 | 58 | 34.5 |
| Ex. 3 U1262073 | Sepharose ™ 6B | 1.3M Na$_2$SO$_4$ | 96.7 | 76 | 32.5 |
| Ex. 4 U1262074 | Sepharose ™ 6B | 0.5M MgSO$_4$ + 0.5M Na$_2$SO$_4$ | 96.9 | 55 | 85 |
| U1262066 Comp Ex 5 | Sepharose ™ 4B | — | — | 83 | 6 |
| U1262067 Comp. Ex. 6 | Sepharose ™ 6B | — | — | 89 | 10 |

TABLE 2

Effectivity testing

| Prototype | Asymmetry | Plate number (Nm) |
|---|---|---|
| Ex. 2, U1262069 | 1.00 | 1609 |
| Ex. 3, U1262073 | 0.77 | 2520 |
| Ex. 4, U1262074 | 1.26 | 1489 |
| Comp. Ex 5, U1262066 | 0.75 | 2281 |
| Comp. Ex 6, U1262067 | 0.49** | 886** |

*Acceptable asymmetry for the present purpose
**Even after repeating this packing 4 times, it still did not fulfil the criteria set in the present test.

TABLE 3

Available pore surface

| Prototype | Base matrix | Flow rate (max) (ml/min) | Particle diameter (Malvern, d50$_v$) 110000) |
|---|---|---|---|
| Ex. 2, U1262069 | Sepharose ™ 4B | 34.5 | 0.67 |
| Ex. 3, U1262073 | Sepharose ™ 6B | 32.5 | 0.59 |
| Ex. 4, U1262074 | Sepharose ™ 6B | 85 | 0.10 |
| Comp. ex. 5, U1262066 | Sepharose ™ 4B | 6 | 0.65 |
| Comp. ex. 6, U1262067 | Sepharose ™ 6B | 10 | 0.46 |

Examples 7-10

Salt-Treatment of Membranes

Example 7

Impregnation of Membrane in Agarose Solution

Membrane A

A 1% agarose solution was prepared by dissolving 0.3 g of agarose in 30 mL water at 95° C. for 3 h00. A regenerated cellulose membrane (Sartorius, 0.45 μm, product no. 3518406-047N) was then immersed in the agarose solution for 1 h00 at 95° C. The membrane was then removed from the agarose solution and allowed to cool down to room temperature so that agarose could gel within the membrane structure.

Example 8

Treatment of Membrane in Salt Solution

Membrane B

The hybrid membrane A prepared as described in Example 7 was immersed in ammonium sulfate ((NH$_4$)$_2$SO$_4$) (1 M solution) (50 mL) at 96° C. for 1 h00 and then removed from the solution and allowed to cool down. The membrane was washed extensively with water.

Example 9

Measurement of Membrane Flow Capacity

A piece of the membrane prepared and treated as described above was put in a 15 mm diameter filter funnel and 0.7 bar of vacuum was applied. 50 mL of water was poured into the funnel and a stop watch was started. The time until all water had passed the membrane was recorded. Triplicate analysis was performed.

The flow in mL per square centimeter and min was calculated.

Example 10

Results on Membrane Flow Capacity

| Membrane | Agarose solution(%) | Salt treatment | Flow (ml/min/cm$^2$) |
|---|---|---|---|
| Reference | — | — | 21.8 |
| Membrane A | 1 | no | 2.1 |
| Membrane B | 1 | yes | 18.7 |

The above examples illustrate specific aspects of the present invention and are not intended to limit the scope thereof in any respect and should not be so construed. Those skilled in the art having the benefit of the teachings of the present invention as set forth above, can effect numerous modifications thereto. These modifications are to be construed as being encompassed within the scope of the present invention as set forth in the appended claims.

What is claimed is:

1. A method of preparing a separation matrix comprising:
   (a) providing an aqueous suspension of particles comprised of gelled native polysaccharide;
   (b) salt-treatment of the suspended particles by adding at least one salt; and
   (c) cross-linking of the salt-treated particles;
   wherein the salt(s) are added up to a salt concentration in the suspension in the range of 0.5 to 1.3 M, and wherein the temperature during the salt-treatment is in the range of 94-98° C.

2. The method of claim 1, wherein the polysaccharide is agarose.

3. The method of claim 1, wherein the anion of the salt added in step (b) is a sulphate.

4. The method of claim 1, wherein the cation of the salt is selected from the group consisting of Mg; Na; K; Li; and Cu.

5. The method of claim 4, wherein the cation of the salt is selected from the group consisting of Mg and Na.

6. The method of claim 1, wherein the salt is MgSO$_4$.

7. The method of claim 1, wherein the temperature during the salt treatment is about 96° C.

8. The method of claim 1, wherein the polysaccharide particles of step (a) have been prepared by emulsification in an organic solvent.

9. The method of claim 8, wherein the particles are washed after the emulsification.

10. The method of claim 1, additionally comprising a step of attaching chromatography ligands to hydroxyl groups of the gelled polysaccharide.

11. A cross-linked polysaccharide separation matrix produced by the method of claim 1.

12. The matrix of claim 11, wherein the available pore volume corresponds to a $K_{av}$ value for a dextran of 110 kD of at least 0.5.

13. A chromatography column comprising the separation matrix of claim 11.

14. A method of preparing a separation matrix comprising:
  (i) providing an aqueous solution of a gelatable native polysaccharide;
  (ii) lowering the temperature of the polysaccharide solution to a value below its gelling point;
  (iii) salt-treatment by adding at least one salt selected from sulphate or phosphate salt to the polysaccharide resulting from (ii); and
  (iv) cross-linking the salt-treated polysaccharide;
  wherein the salt(s) are added up to a salt concentration in the range of 0.5 to 1.3 M, and wherein the temperature during the salt-treatment is in the range of 94-98° C.

15. A cross-linked polysaccharide separation matrix produced by the method of claim 14.

16. The matrix of claim 15, which is a membrane or a monolith.

* * * * *